US008007760B2

(12) United States Patent
Kanazirev

(10) Patent No.: US 8,007,760 B2
(45) Date of Patent: Aug. 30, 2011

(54) PROCESS FOR PRODUCING ENHANCED ALUMINA

(75) Inventor: Vladislav I. Kanazirev, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 298 days.

(21) Appl. No.: 12/332,421

(22) Filed: Dec. 11, 2008

(65) Prior Publication Data

US 2010/0150820 A1    Jun. 17, 2010

(51) Int. Cl.
C01F 7/02    (2006.01)
C01C 1/26    (2006.01)
C01F 7/00    (2006.01)

(52) U.S. Cl. .................. 423/625; 423/420; 423/600
(58) Field of Classification Search .......... 423/420, 423/600, 625–631
See application file for complete search history.

(56) References Cited

U.S. PATENT DOCUMENTS

| | | | |
|---|---|---|---|
| 2,783,124 A | 2/1957 | Grote | |
| 3,389,975 A | 6/1968 | Van Nordstrand | |
| 3,459,502 A | 8/1969 | Van Nordstrand | |
| 3,557,025 A | 1/1971 | Emerson et al. | |
| 3,623,837 A | 11/1971 | Kelly et al. | |
| 3,629,153 A | 12/1971 | Pryor | |
| 3,714,343 A * | 1/1973 | Shozo et al. | 423/628 |
| 3,739,062 A | 6/1973 | Barsotti | |
| 3,878,166 A | 4/1975 | Woycheshin et al. | |
| 3,911,090 A | 10/1975 | Hem et al. | |
| 4,053,579 A * | 10/1977 | Kato et al. | 423/630 |
| 4,221,771 A | 9/1980 | van der Heem | |
| 4,292,295 A | 9/1981 | Pajot et al. | |
| 4,356,157 A | 10/1982 | Altman | |
| 4,468,375 A | 8/1984 | Misra | |
| 5,078,983 A | 1/1992 | Herold | |
| 5,286,687 A | 2/1994 | Murase et al. | |
| 5,811,362 A * | 9/1998 | Da Silva et al. | 502/9 |
| 5,997,836 A | 12/1999 | Sato et al. | |
| 6,013,600 A | 1/2000 | Kanazirev | |
| 7,307,033 B2 | 12/2007 | Maki et al. | |
| 7,351,394 B2 | 4/2008 | Maki et al. | |
| 2006/0252642 A1 | 11/2006 | Kanazirev | |
| 2007/0275846 A1 | 11/2007 | Kanazirev et al. | |

FOREIGN PATENT DOCUMENTS

CA    863262    2/1971

OTHER PUBLICATIONS

Ye et al., "Preparation of Ultrafine alpha-Al2O3 Powder by Thermal Decomposition of AACH at Low Temperature", The Chinese Journal of Process Engineering, vol. 2, No. 4, Aug. 2002.*
Ma et al., "Synthesis and thermal decomposition of ammonium aluminum carbonate hydroxide (AACH)", Materials Chemistry and Physics 72 (2001) 374-379.*
U.S. Appl. No. 12/332,443, filed Dec. 11, 2008, Kanazirev.
Ali, "Dawsonite-Type Precursors for Catalytic Al, Cr, and Fe Oxides: Synthesis and Characterization", Chem. Mater. 2005, 17, 6797-6804.
Yalfani, "In Situ Studies During Thermal Activation of Dawsonite-Type Compounds to Oxide Catalysts", J. Mater. Chem., 2007, 17, 1222-1229.
Noma, "NMR Study of Bicarbonate Ions on Mineral Surfaces . . . ", Symposia Paper presented before the Div. of Environ. Chem., Amer. Chem. Society, San Diego, CA, Apr. 1-5, 2001.
Christie, "Reaction of Molten Sodium Carbonate with Aluminum Oxide", Journal of Physical Chemistry, vol. 82, No. 1, 1978, pp. 33-37.
Stoica, "Reconstruction of Dawsonite by Alumina Carbonation in (NH4)2 CO3: Requisites and Mechanism", Chem. Mater. 2008, 20, 3973-3982.
Stoica, "Reforming Dawsonite by Memory Effect of AACH-Derived Aluminas", Chem. Mater. 2007, 19, 4783-4790.
Gesing, "Structure and Spectroscopic Properties of Hydrogencarbonate Containing Aluminosilicate Sodalite and Cancrinite", Zeitschrift Kristallogr. 215 (2000) 413-418.
Pitsch, "Synthesis and Characterization of Fe2O3 Containing Aluminas by Thermal Decomposition of Modified Ammonium Dawsonite", J. Mater. Chem., 2001, 11, 2498-2503.
Hackbarth, "Synthesis and Crystal Structure of Carbonate Cancrinite Na8[AlSiO4] 6CO3(H2O)3.4 . . . ", Microporous and Mesoporous Materials 30 (1999) 347-358.
Potdar, "Synthesis of Nano-Sized Porous Gamma-Alumina Powder Via a Precipitation/Digestion Route", Applied Catalysis A: General 321 (2007) 109-116.

* cited by examiner

*Primary Examiner* — Stanley Silverman
*Assistant Examiner* — Anthony J Zimmer
(74) *Attorney, Agent, or Firm* — Mark Goldberg

(57) ABSTRACT

The present invention provides an essentially dry method for preparation of enhanced alumina powders. The first step involves rapid calcination of an aluminum compound to produce alumina powder. The alumina powder is mixed with solid ammonium carbonate and a small amount of water. This mixture heats itself although some external heat is helpful to produce ammonium aluminum hydroxycarbonate (dawsonite-type) $NH_4AlCO_3(OH)_2$ upon curing which is then decomposed to produce enhanced alumina having a specific desired morphology and nano-sized dimensions.

13 Claims, No Drawings

PROCESS FOR PRODUCING ENHANCED ALUMINA

BACKGROUND OF THE INVENTION

Alumina powders are widely used is many areas of industry and life such as for supports of catalysts, adsorbents, additives, in the ceramic industry, fillers and others.

There is a need for alumina supports with high BET surface area and pore volume combined with a suitable bulk density, stability and ability easily to accommodate additives. One can refer to such alumina supports as enhanced alumina (EA). Simple alumina powder manufacturing methods are also needed.

Dawsonite, sodium aluminum dihydroxide carbonate $(NaAlOH)_2CO_3)$ and its alkali metal and ammonium analogs are useful compounds that either occur naturally or are synthesized by a variety of processes which in the prior art have taken place in aqueous medium. In U.S. Pat. No. 4,356,157, dawsonite was produced by combination of aluminum hydroxide and an alkali metal or ammonium hydrogencarbonate at high pressure and at temperatures between 150° and 250° C.

SUMMARY OF THE INVENTION

This invention provides an essentially dry method for preparation of enhanced alumina powders. It includes three important steps. The first step involves rapid (flash) calcination of an aluminum compound, usually a hydroxide and typically $Al(OH)_3$ (gibbsite) as conventionally produced in the Bayer process. This step is practiced industrially for manufacturing activated alumina particulates and special powders capable of rehydration. Alumina powder produced in the first step is mixed with solid ammonium carbonate in a blender upon addition of a small amount of water. Ammonium hydrogencarbonate (bicarbonate) $NH_4HCO_3$ is the preferred carbonate, but other ammonium carbonates such as $(NH_4)_2 CO_3$, ammonium sesqui carbonate or carbamate can be also used. The mixture heats itself up without addition of external heat, but a moderate heating and curing can be applied to facilitate a reaction that results in the preparation of ammonium aluminum hydroxycarbonate (dawsonite-type) $NH_4AlCO_3(OH)_2$. The third step involves the decomposition of ammonium aluminum hydroxycarbonate to obtain enhanced alumina (EA) with specific morphology and the features of a nano-sized material. Carbon dioxide ($CO_2$ and ammonia ($NH_3$) and water are gaseous decomposition products of hydroxycarbonate as well Carbon dioxide and ammonia can be recovered and reused for the preparation of ammonium bicarbonate that is used as a raw material. The invention differs from the known methods for alumina powder production such as hydrolysis of aluminum alkoxides and different precipitation routes. It differs also from the methods that employ rehydration of flash calcined alumina (FCA) that usually are followed by autoclaving and thermal treatment. No significant liquids or emissions are involved. The carbonate additive can be used in a dry form and can be easily recovered for re-use by capturing $NH_3$ and $CO_2$ evolved in the decomposition stage.

FCA alumina powder produced industrially by flash calcination of gibbsite and known as A-300 product of UOP LLC is mixed in a blender with reagent grade ammonium bicarbonate powder upon addition of small amounts of water. The mixture is free flowing but it changes somewhat the flow pattern and the resistance to mixing upon water addition. The temperature also increases and exceeds 45° to 50° C. After 30 to 45 minutes, the resulting powder is transferred to a plastic container and additionally cured in an oven at 55° to 60° C. to complete the reaction. The last step of the process is the thermal decomposition of NH4-dawsonite producing enhanced alumina with high BET surface area and pore volume.

Optionally, the source alumina may undergo a treatment with acid solution followed by washing and drying. The purpose of this treatment being to reduce the residual sodium in the case when the source alumina is derived from the Bayer process of alumina production. Such alumina material normally contains 0.2 to 0.5 mass-% sodium expressed as the oxide. Low soda alumina is desired when used as catalyst support. Instead on the source alumina, the treatment with the acid solution can be performed directly on the enhanced alumina produced after decomposition of the hydroxycarbonate product.

The process of producing enhanced alumina through described hydroxycarbonate, (dawsonite-type) intermediate can be combined with the use of additives in order to enhance even further the properties of the final product. Additives in both solid and liquid form can be used. Alumina having increased thermal stability is produced if the water in the hydroxycarbonate formation step is replaced by colloidal silica solution.

DETAILED DESCRIPTION OF THE INVENTION

This invention provides an essentially dry method for preparation of enhanced alumina powders. It includes three important steps. The first step involves rapid (flash) calcination of an aluminum compound, usually a hydroxide and typically $Al(OH)_3$ (gibbsite) as conventionally produced in the Bayer process. This step is practiced industrially for manufacturing activated alumina particulates and special powders capable of rehydration. The simplified reaction is shown in reaction (1). The alumina produced in the first step is referred to as flash-calcined alumina (FCA).

$$2Al(OH)_3 + heat \rightarrow Al_2O_3 + 3H_2O \qquad (1)$$

Other aluminas such as these produced by hydrolysis of aluminum alkoxides, precipitation or hydrothermal treatment of alumina sources can be easily used as a raw material for producing enhanced alumina according the invention provided these aluminas have sufficient reactivity towards ammonium carbonate reagent. Generally, having at least 50 $m^2/g$ BET surface area and some rehydratability are important conditions for suitability to serve as alumina raw material.

Alumina powder produced in the first step is mixed with solid ammonium carbonate in a blender upon addition of a small amount of water. Ammonium bicarbonate carbonate $NH_4HCO_3$ is the preferred carbonate, but other ammonium carbonates such as $(NH_4)_2CO_3$ and sesqui carbonate or carbamate can be also used. The mixture heats itself up without addition of external heat, but a moderate heating and curing can be applied to facilitate reaction (2) that results in the preparation of ammonium aluminum hydroxycarbonate (dawsonite-type) $NH_4AlCO_3(OH)_2$ intermediate. Depending on the conditions of the reaction and curing steps, two different hydroxycarbonate intermediates have been identified.

Curing at longer time and higher temperatures produces the classical ammonium dawsonite as identified by X-ray diffraction patterns while lower temperatures and shorter contact times produces another, yet unknown ammonium aluminum hydroxycarbonate which for the purpose of this invention is named "HYCARB". Both X-ray pattern and FTIR (fourier transform infrared) spectra show significant differences between HYCARB and the classical ammonium dawsonite.

$$Al_2O_3 + 2NH_4HCO_3 + H_2O = 2NH_4AlCO_3(OH)_2 \quad (2)$$

The reaction (2) can be carried in different extend depending on the needs of obtaining enhanced alumina properties. Both partial and practically full conversion of the source alumina to enhanced alumina can be achieved. Repeating step 2 upon addition of fresh portions of ammonium carbonate speeds up the conversion process of alumina. The use of a small amount, typically from 2 to 10 mass-%, of ammonium aluminum hydroxycarbonate powder in step 2 also facilitates the conversion of the source alumina to hydroxycarbonate The third step involves the decomposition of ammonium dawsonite to obtain enhanced alumina (EA) with specific morphology and the features of a nano-sized material-reaction (3).

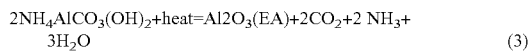
$$2NH_4AlCO_3(OH)_2 + heat = Al_2O_3(EA) + 2CO_2 + 2NH_3 + 3H_2O \quad (3)$$

The decomposition step can be carried out in a variety of devices. Preferred are devices that allow for re-use of the decomposition products. Usually, temperatures from 130° to 320° C. are sufficient to fully decompose the hydroxycarbonate intermediate while the lower range is especially preferred when step 2 of the process leads to HYCARB formation. Additional heat treatment can be carried out depending on the application needs. Treatment at temperatures of about 600° C. is performed if the final product should have gamma alumina as the mail alumina crystalline phase.

The particle morphology of the final alumina differs significantly from that of the source material. The main difference is the appearance of multitude of rod-like subparticles which arise and are entrenched in the original particle. The width of the rods is regularly less than 100 nanometers while the length is limited to few micrometers.

Carbon dioxide and ammonia can be recovered from reaction (3) and reused for the preparation of ammonium bicarbonate that is used as a raw material for reaction (2). The invention differs from the known methods for alumina powder production such as hydrolysis of aluminum alkoxides and different precipitation routes. It differs also from the methods that employ rehydration of flash calcined alumina (FCA) followed usually by combination of acid treatment, autoclaving and thermal treatment. No significant liquids or emissions are involved. The carbonate additive can be used in a dry form and can be easily recovered for re-use by capturing $NH_3$ and $CO_2$ evolved in the decomposition stage.

EXAMPLE 1

About 100 g A-300 alumina is mixed with about 150 g solid ammonium carbonate in a blender upon addition of about 24.5 g water as described above. The material was cured overnight at about 71° C. in a sealed container. The resulting powder is then calcined at 400° C. for 1 hour in a muffle oven to produce enhanced alumina with improved thermal stability.

EXAMPLE 2

The experiment in Example 1 is repeated but 34.5 g colloidal silica Nalco 1130 is used instead of water.

EXAMPLE 3

Comparison A-300 powder has been treated at the equipment described in Example 1. No bicarbonate was added but only 30.4 g deionized water. The sample was then calcined at 400° C. for 1 hour.

EXAMPLE 4

The conditions of Example 1 were applied but the duration of 400° C. calcination step was 16 hours.

EXAMPLE 5

The same condition as Example 4 but the calcination temperature was 600° C.

EXAMPLE 6

The same condition as Example 4 but the calcination temperature was 800° C.

The calcined samples of Examples 1 to 6 were analyzed using the common method for BET surface area and pore volume determination by low temperature nitrogen adsorption. In addition, selected samples were analyzed for thermal stability using a DTA (differential thermal analyzer), air flow and a temperature programming rate of 5° C./min. The temperature of the specific exothermic effect showing the transition to alpha alumina phase was registered as a measure of thermostability. The data obtained are summarized in the Table whereas the sample according Example 3 represents a comparison sample produced without any addition of ammonium carbonate.

TABLE

| Sample | Calcination ° C. | Calcination hours | BET $m^2/g$ | Pore volume cc/g | Alpha transition temperature by DTA ° C. |
|---|---|---|---|---|---|
| Example 3 | 400 | 1 | 340 | 0.279 | 1180 |
| Example 1 | 400 | 1 | 502 | 0.774 | 1263 |
| Example 2 | 400 | 1 | 387 | 0.786 | 1220 |
| Example 4 | 400 | 16 | 467 | 0.799 | |
| Example 5 | 600 | 16 | 255 | 0.712 | |
| Example 6 | 800 | 16 | 169 | 0.640 | |

The data in the Table show that the invention produces alumina with much higher BET surface area, pore volume and thermal stability as compared to the source alumina.

The invention claimed is:
1. A process for producing alumina comprising:
   a) providing a quantity of alumina powder;
   b) mixing said alumina powder with a solid ammonium carbonate and from 5 to 30 weight percent water to form a mixture;
   c) allowing said mixture to cure at a temperature from about 45° to 85° C. to produce ammonium aluminum hydroxycarbonate; and
   d) then decomposing said ammonium aluminum hydroxycarbonate at a temperature from about 130° to 320° C. to produce an enhanced alumina.
2. The process of claim 1 wherein after said mixture has cured an additional amount of said solid ammonium carbonate is added to said ammonium aluminum hydroxycarbonate and allowed to cure at 45° to 85° C.

3. The process of claim 1 wherein said alumina powder is selected from the group consisting of calcined $Al(OH)_3$, alumina produced by hydrolysis of aluminum alkoxide, precipitated alumina and hydrothermally treated alumina.

4. The process of claim 1 wherein said alumina powder has a BET surface area greater than 50 $m^2/g$.

5. The process of claim 1 wherein said mixture is allowed to cure without application of heat to said mixture.

6. The process of claim 1 wherein heat is applied to said mixture in addition to heat produced by an exothermic reaction from said mixture.

7. The process of claim 1 wherein said ammonium carbonates are ammonium bicarbonate, ammonium carbonate, ammonium carbamate or ammonium sesqui carbonate.

8. The process of claim 1 wherein said ammonium carbonate comprises about 2 to 10 mass-% ammonium aluminum hydroxycarbonate.

9. The process of claim 1 wherein carbon dioxide and ammonia produced from said decomposition of said ammonium dawsonite are combined to produce a bicarbonate that comprises at least a portion of said solid ammonium carbonate.

10. The process of claim 1 wherein said enhanced alumina has a BET surface area greater than about 400 BET $m^2/g$.

11. The process of claim 1 wherein said enhanced alumina has a BET surface area greater than about 450 BET $m^2/g$.

12. The process of claim 1 wherein said enhanced alumina has a pore volume greater than about 0.6 cc/g.

13. The process of claim 1 wherein said enhanced alumina is additionally treated with acid solutions to remove the residual sodium contained in source alumina.

\* \* \* \* \*